US010983998B2

(12) United States Patent
Richardson et al.

(10) Patent No.: US 10,983,998 B2
(45) Date of Patent: Apr. 20, 2021

(54) QUERY EXECUTION PLANS BY COMPILATION-TIME EXECUTION

(75) Inventors: Andrew S. Richardson, Redmond, WA (US); Campbell Bryce Fraser, Redmond, WA (US); Cesar A. Galindo-Legaría, Redmond, WA (US); Torsten W. Grabs, Seattle, WA (US); Wei Yu, Issaquah, WA (US); Milind M. Joshi, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1491 days.

(21) Appl. No.: 12/146,423

(22) Filed: Jun. 25, 2008

(65) Prior Publication Data

US 2009/0327214 A1 Dec. 31, 2009

(51) Int. Cl.
*G06F 16/30* (2019.01)
*G06F 16/2453* (2019.01)

(52) U.S. Cl.
CPC .............................. *G06F 16/24545* (2019.01)

(58) Field of Classification Search
CPC ................................................. G06F 16/24545
See application file for complete search history.

(56) References Cited

U.S. PATENT DOCUMENTS 5,301,317 A 4/1994 Lohman et al.
5,335,345 A * 8/1994 Frieder ............ G06F 17/30474
5,987,455 A 11/1999 Cochrane et al.
6,341,281 B1 1/2002 MacNicol et al.
7,136,850 B2 11/2006 Keller et al.
7,143,078 B2 11/2006 Doherty et al.
7,240,044 B2 7/2007 Chaudhuri et al.
7,281,000 B2 10/2007 Kapoor et al.
7,330,848 B2 2/2008 Chaudhuri et al.
7,356,526 B2 4/2008 Gao et al.
7,363,289 B2 4/2008 Chaudhuri et al.
2003/0018618 A1* 1/2003 Bestgen et al. ................... 707/3
2005/0071331 A1* 3/2005 Gao ................. G06F 17/30471
2005/0097100 A1* 5/2005 Galindo-Legaria .......................... G06F 17/3046
2005/0102613 A1* 5/2005 Boukouvalas ...... G06F 17/2247 715/237
2005/0120000 A1* 6/2005 Ziauddin ............... G06F 16/217
2005/0125398 A1* 6/2005 Das ....................... G06F 16/217

(Continued)

OTHER PUBLICATIONS

Cole, et al., "Optimization of Dynamic Query Evaluation Plans", Proceedings of the 1994 ACM SIGMOD International Conference on Management of Data ,1994, ACM, pp. 150-160.

(Continued)

*Primary Examiner* — Mahesh H Dwivedi

(57) ABSTRACT

Described is a query optimizer comprising a query tuner that performs actual execution of query fragments to obtain actual results during compilation time, and uses those actual results to select a query plan. The actual results may be combined with estimates for fragments that were not executed. The tree may be traversed in a top-down traversal, processing every node. Alternatively, the tree may be traversed in a bottom-up traversal, re-deriving data for higher nodes as each lower level is completed. A limit, such as a time limit or level limit, may be used to control how much time is taken to determine the execution plan.

20 Claims, 6 Drawing Sheets

(56) References Cited

U.S. PATENT DOCUMENTS

| | | | |
|---|---|---|---|
| 2005/0187907 | A1* | 8/2005 | Wortendyke ........ G06F 17/3046 |
| 2006/0271504 | A1* | 11/2006 | Anderson et al. ................ 707/2 |
| 2007/0226186 | A1 | 9/2007 | Ewen et al. |
| 2007/0294217 | A1* | 12/2007 | Chen et al. ....................... 707/2 |
| 2008/0288446 | A1* | 11/2008 | Hu ...................... G06F 16/2462 |

OTHER PUBLICATIONS

Kache, et al., "POP/FED: Progressive Query Optimization for Federated Queries in DB2", Proceedings of the 32nd International Conference on Very Large Data Bases , 2006, ACM, pp. 1175-1178.
Ilyas, et al., "Estimating Compilation Time of a Query Optimizer", Proceedings of the 2003 ACM SIGMOD International Conference on Management of Data , 2003, ACM, pp. 12.
Kabra, et al., "Efficient Mid-Query Re-Optimization of Sub-Optimal Query Execution Plans", ACM SIGMOD Record, vol. 27, No. 2, 1998, ACM, pp. 106-117.

* cited by examiner

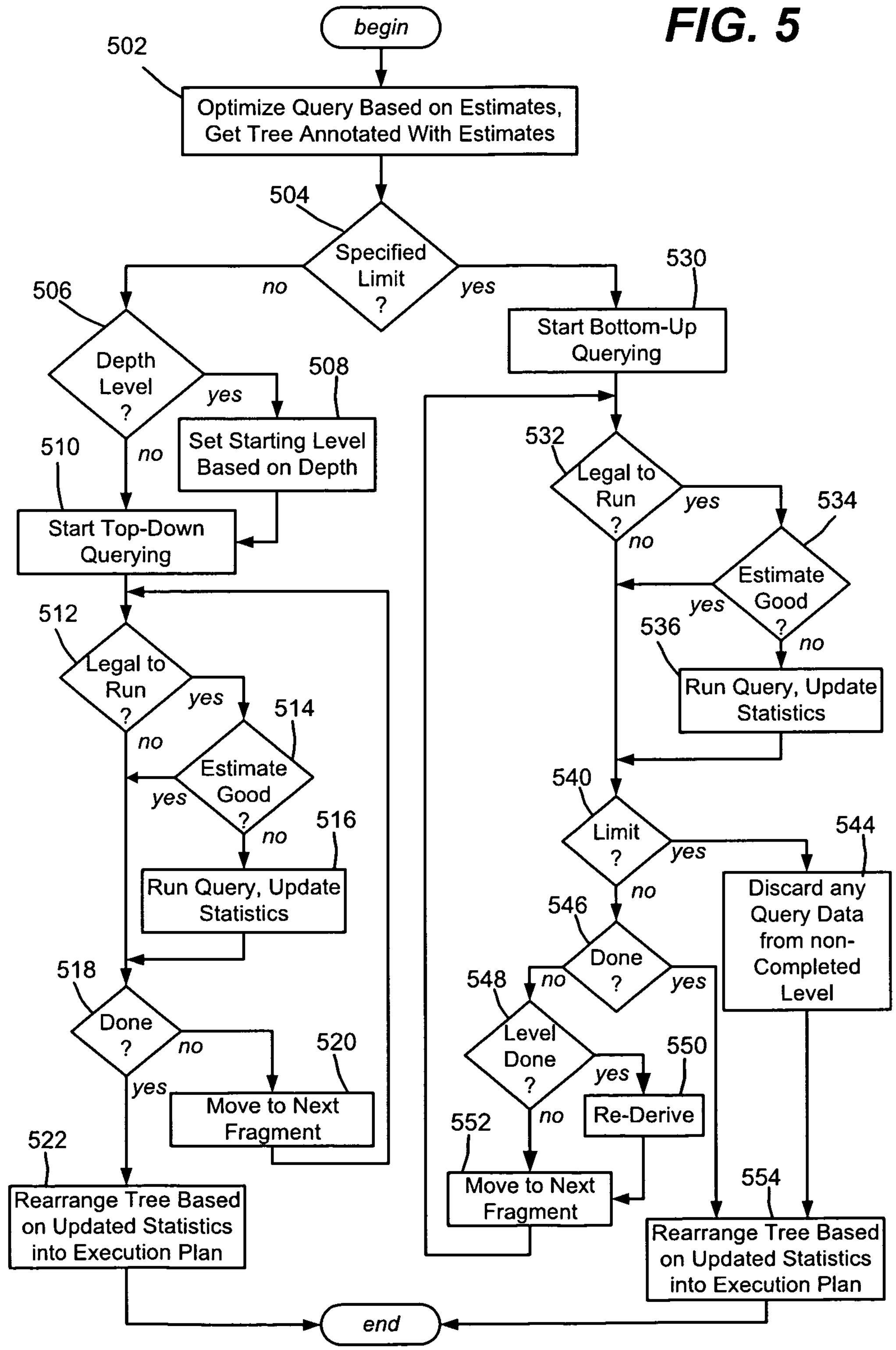
FIG. 5
begin
502
Optimize Query Based on Estimates, Get Tree Annotated With Estimates
504
Specified Limit ?
no
yes
506
Depth Level ?
yes
508
Set Starting Level Based on Depth
510
no
Start Top-Down Querying
512
Legal to Run ?
yes
514
no
Estimate Good ?
yes
no
516
Run Query, Update Statistics
518
Done ?
no
520
yes
Move to Next Fragment
522
Rearrange Tree Based on Updated Statistics into Execution Plan
530
Start Bottom-Up Querying
532
Legal to Run ?
yes
534
no
Estimate Good ?
yes
536
no
Run Query, Update Statistics
540
Limit ?
yes
544
Discard any Query Data from non-Completed Level
no
546
Done ?
548
no
yes
Level Done ?
550
yes
Re-Derive
552
no
Move to Next Fragment
554
Rearrange Tree Based on Updated Statistics into Execution Plan
end

QUERY EXECUTION PLANS BY COMPILATION-TIME EXECUTION

BACKGROUND

Given a database query of any complexity, there are typically many alternative ways to execute that query, each with (possibly widely) varying performance. To provide for efficient resource usage, and in particular fast query processing, when a query is submitted, a query optimizer is used to arrange that query into an execution plan. Standard query optimizers evaluate execution plans for queries by enumerating possible alternatives and estimating the time each of them will take to execute. Estimation in turn is done via statistics that reflect data distribution of the tables involved in the query.

However, the estimations are sometimes far off, especially for queries that have complex selection predicates and query constructs. In those cases, the query optimizer may choose a plan that is much slower than other alternatives.

The use of more sophisticated statistics, such as multi-dimensional histograms, has been proposed to improve the accuracy of estimation, and therefore improve the consistency and quality of chosen execution plans. However, these sophisticated statistics require complex code, and moreover, do not cover the full expressivity of typical query languages such as SQL.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an enhanced query optimizer, referred to as a query tuner, performs actual execution of query fragments to obtain actual results during compilation time, and uses those actual results to select a query plan. The actual results may be combined with estimates for fragments that were not executed.

In one aspect, a tree of nodes corresponding to a query is traversed. For each node, an actual query may be run to obtain actual data corresponding to the actual number of rows output by that node and all the nodes below it. The actual data for the nodes, along with any estimated data, is used to determine an execution plan for the query.

In one aspect, the tree may be traversed in a top-down traversal, processing every node in the tree from a starting level, which may be the root node level. Alternatively, the tree may be traversed in a bottom-up traversal, re-deriving data for higher nodes as each lower level is completed. A limit, such as a time limit or level limit, may be used to control how much time is taken/resources are consumed to determine the execution plan.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 5 is a flow diagram representing example steps taken by a query tuner to run queries on nodes of a tree representing a query.

DETAILED DESCRIPTION

Various aspects of the technology described herein are generally directed towards performing actual execution of query fragments during compilation time to obtain actual results used in selecting an execution plan. The actual results may be combined with the estimates obtained via traditional, statistics-based estimation. The use of actual data results in more accurate information at compilation time, and therefore facilitates a more reliable selection of an execution plan by the query optimizer.

Note that the expense of such compile-time validation may be significant, and thus query tuning typically will be used when the resulting query plan is expected to be used multiple times, so that the performance improvement obtained from the improved query plan justifies taking the extra compilation time. As described herein, mechanisms may be used to limit the additional query tuning overhead, and thereby balance the compilation time overhead against the benefit obtained.

Figure 1:
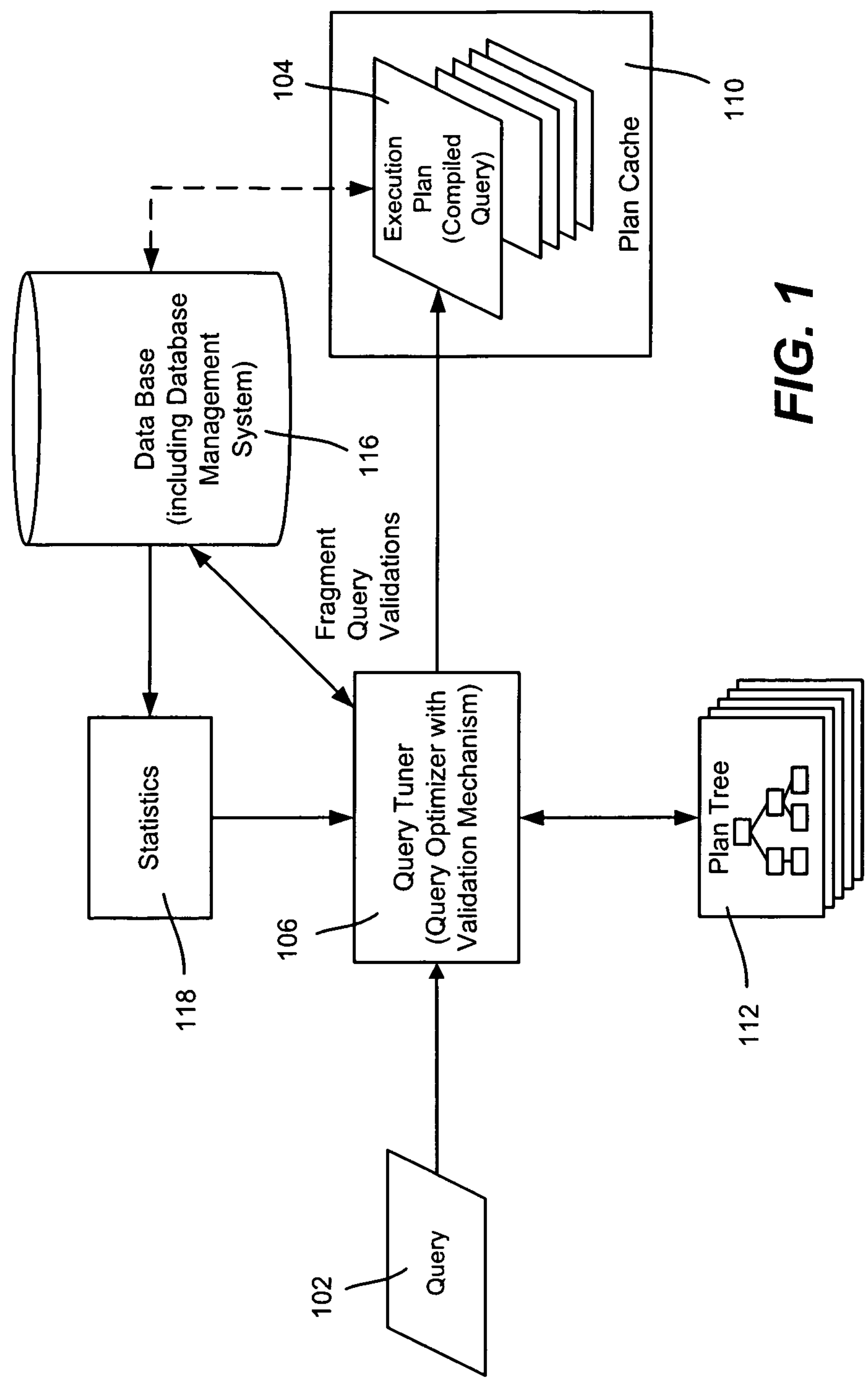
FIG. 1 is a block diagram showing various example components in a database environment, including a query tuner that uses actual querying to validate/improve estimates.

Turning to FIG. 1, there is shown a computing/data processing environment in which a query 102 is processed into an execution plan 104, by a query optimizer operating in a compilation phase. The query optimizer includes a validation mechanism that runs actual queries, and is referred to herein as the query tuner 106. The execution plan may be stored for multiple reuse, along with possibly other plans, e.g., in a plan cache 110.

In general, the query tuner 106 attempts to determine the most efficient execution plan for a query, somewhat similar to a standard query optimizer, but further actually executes fragments of the query to obtain actual execution data rather than relying solely on estimates. To this end, the query tuner 106 may represent each candidate query plan as a tree of nodes, or plan tree 112, in which each node represents a single operation that is performed in executing the query.

Together the nodes form a tree, in which intermediate results flow from the bottom of the tree towards the top node, which outputs the final query results. Thus, a node may have no child nodes, one child node or more than one child node that each provides their output as input to a parent node. For example, a node representing a join operation has two child nodes, which each represent one of the two datasets to join together. A sort node has a single child node that provides the sort node with the input to be sorted, as does a filter node that filters a child node's input into output.

As can be readily appreciated, the nodes can be rearranged in possibly many different, permissible ways that will each provide the correct results. It is the task of the query tuner 106 to determine which way is most efficient, and to select that way as the execution plan. As will be understood, this will be accomplished through actual fragment query execution against the database (or possibly a copy thereof) 116, which may be used in conjunction with estimates obtained from statistics for non-executed operations.

Note that some subtrees/nodes cannot be validated by actual execution for various reasons, including nodes that change the semantics of their children (e.g. a subtree with a "Top X" node should not be executed because such an execution would result in under reporting the cardinality of the nodes below the "Top X"). Another type that cannot be executed is one whose execution produces side effects (like changing data) that are temporarily visible or remain visible to other queries beyond the execution of the subtree query, and so forth, e.g., those that update an actual table. Side effects are allowed if they are limited to the actual execution and do not affect the overall query result; that is, the result (rowset produced and messages generated) when performing the optimization has to be identical to the result as if the optimization was not applied. Some execution operations are uncertain as to their effect, and thus are not executed. As referred to herein, a "legal" node or subtree is one that can be safely executed.

Thus, unlike a standard optimizer that estimates cardinality data for the various alternatives, the query tuner 106 provides functionality to validate, revise and/or select among query plans in the query optimizer based on actual executions of at least some of the query fragments of a query (as represented by the subtrees contained in a query tree). This comes at an additional cost due to the time taken to execute each query fragment, but is valuable in determining execution plans, such as for queries having tight overhead constraints that are unable to be determined via standard query optimization. As such, the query tuner 106 will likely be employed selectively, such as to find more efficient execution plans for frequently run and/or resource-intensive queries. It may be used where customers face plan-related performance problems and want to determine better query plans for plan forcing or plan guides by more thorough query optimization. Moreover, as described below, the query tuner 106 may include limiting mechanisms that limit the additional validation overhead, to balance the compilation time overhead against the benefit obtained.

By way of example of using the query tuner 106, the validation functionality may be invoked (if off by default) through a query hint or as a database option, (e.g., "TUNE QUERY") in the following example:

```
SELECT
        datepart(year, d.date_value) as calyear
      , datepart(month, d.date_value) as calmonth
      , sum(sales_qty*sale_amt) as sales
FROM Tbl_Fact_Store_Sales s
INNER JOIN Tbl_Dim_Date d
ON s.sk_date_id = d.sk_date_id
WHERE d.date_value BETWEEN '01/01/2004' AND '12/31/2005'
GROUP BY datepart(year, d.date_value), datepart(month,
d.date_value)
OPTION (TUNE QUERY)
go
```

Note that such an option or the like may specify a limit on the additional overhead of query optimization via additional data, such as via a "using" keyword. In the above example, the hint/option is "OPTION(TUNE QUERY USING 60)," wherein the number specifies the allowed optimization time in seconds, for example. Another limit may be a level limit, corresponding to stopping after reaching a certain level in the tree.

When invoked, the query tuner 106 generates a tree (graph) that represents multiple possibilities for execution. Each of the nodes in the graph represents the result of a computation. The number of rows to process in each node (its "cardinality") is estimated based on the statistics 118, as applied relative to each node from the statistics applied to its lower nodes, e.g., in a bottom up computation. Errors can be introduced in this estimation process, and further, such errors may be compounded.

After annotating the nodes with the initial estimation, a set of nodes is chosen for actual execution. These nodes are executed in the system to obtain exact cardinality and actual statistics of the result, which are then used to update estimates in dependent nodes. Note that in addition to actual cardinality obtained from the result of the partial execution, histograms of the result of the partial execution are also obtained; such histograms may be used for better estimation and/or faster execution, as described below.

There are various ways to choose which nodes of the subtrees to execute. For example, in one implementation, the query tuner 106 has two policies to execute nodes in the graph, namely top-down or bottom-up.

Top-down execution is directed towards exhaustive execution of all alternatives. Each actual plan is made up of multiple nodes, whereby in a single query execution, the query tuner mechanism gets exact cardinality values for all legal nodes (some nodes cannot be queried, as described above). Note that there are many alternative trees possible; the tree alternative that is traversed can be built based on statistics, e.g., first obtained via standard query optimization.

Figure 2:
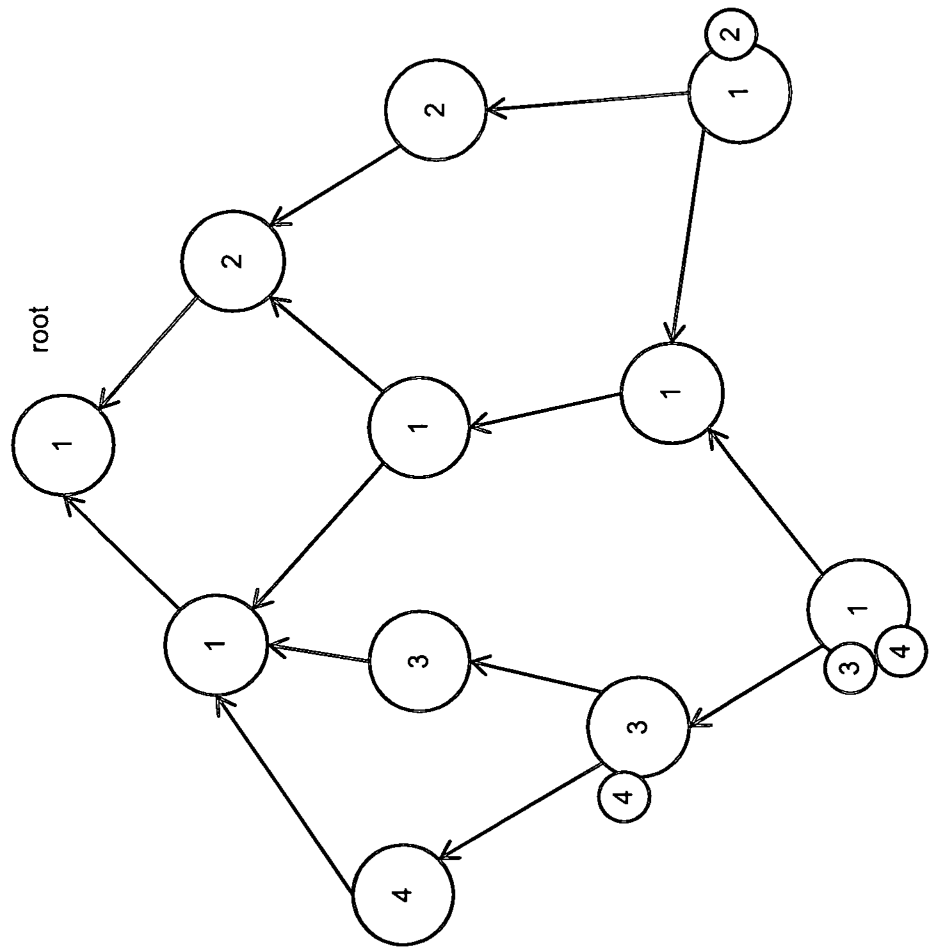
FIG. 2 is a representation of an example tree (graph) of executable nodes of a query in which top-down query tuning by node execution is performed.

Thus, as generally represented in FIG. 2, executing an upper node, e.g., starting at the root, will provide information about any children nodes below. By way of example, in FIG. 2, starting at the root, the nodes labeled one (1) are queried on a first execution path; the child that is selected first may be based on statistics, if desired, (or based upon other criterion as described below) Next, the path corresponding to the next level down is completed, that is, the child of the root not previously queried, labeled two (2) in FIG. 2, and its children are executed. The process continues for the lower levels, starting at three (3) and ending at four (4) until all legal nodes have been processed.

As the query tuner mechanism traverses other nodes, the query tuner mechanism skips executing those that already have accurate information obtained (and saved) from a previous execution. Thus, for example, the small labeled circles indicate actual execution of a node was not necessary an additional time for that execution path, because that node was executed in a previous execution path.

Note that top-down execution need not start at the root node, but rather at some level below the root node, e.g., level three may be specified as the starting point. Existing statistics are used for levels that are not executed.

Figure 3:
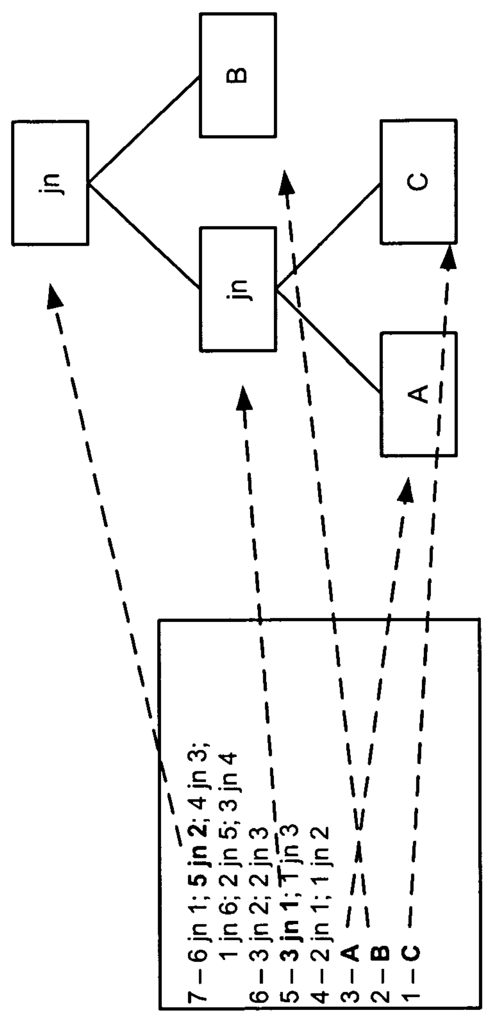
FIG. 3 is an example data structure showing a compact way to represent nodes of a tree and alternative candidate execution plan arrangements corresponding to a query.

FIG. 3 shows a data structure that is used to compactly represent alternatives and track execution. In general, each executable node is represented by its respective operation, and each leaf node by a letter or other identifier that represents the data being operated on. A different number corresponds to each leaf and to each executable node, or to a group of numbers.

Thus, in the simple example of FIG. 3, the number 1 represents the leaf node C, the number 2 represents the leaf node B, and the number 3 represents the leaf node A. The number 4 represents the join of 2 (B) and 1 (C), and in the opposite order of 1 (C) and 2 (B), the number 5 represents the join of represents the join of 3 (A) and 1 (C), and in the opposite order of 1 (C) and 3 (A). The number 6 represents the join of 3 (A) and 2 (B), and in the opposite order of 2 (B) and 3 (A). A number that represents a group can also be in another group; thus, the number 7 represents the combinations of the groups below it, which themselves are groups and nodes combinations, e.g., the group 7 contains group 5 joined with group 2, where group 5 represents a join node, and group 2 is a single leaf node. In this manner, and by tracking which nodes in a group have been executed, the various combinations can be processed, without repeating execution once already performed.

Figure 4:
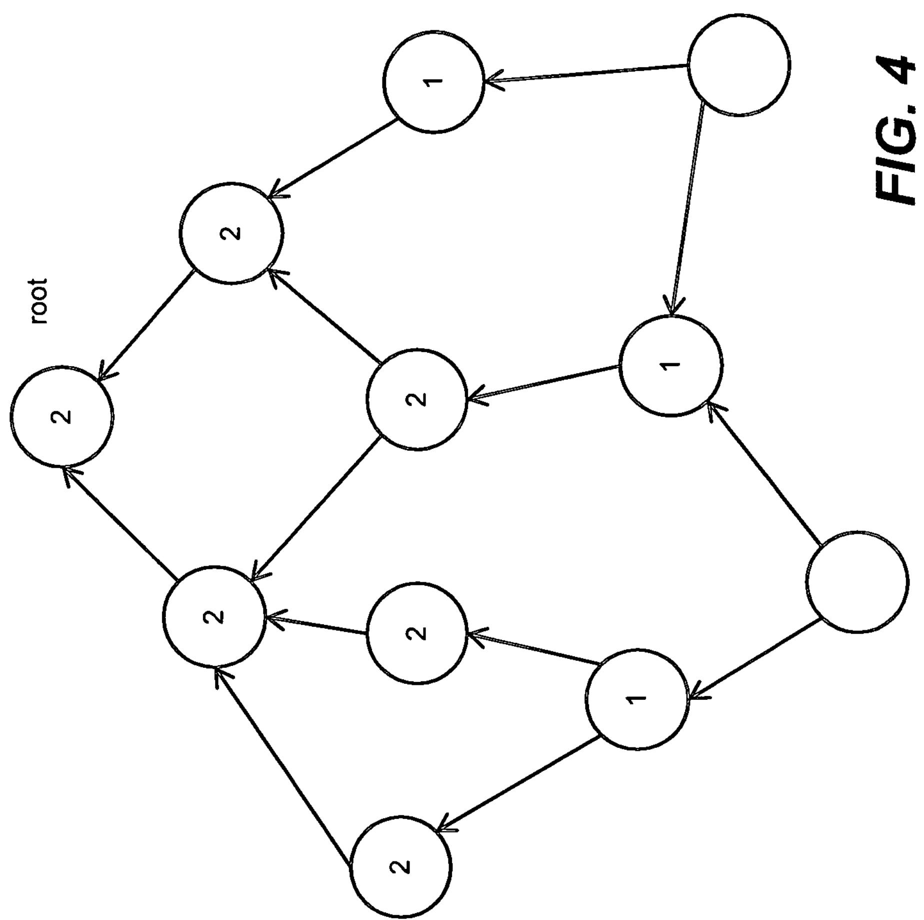
FIG. 4 is a representation of an example tree (graph) of executable nodes of a query in which bottom-up query tuning by node execution is performed.

Turning to FIG. 4, bottom-up execution is geared towards a limited execution of the various alternatives. In bottom-up execution, the query tuner mechanism computes statistics of the result and then uses those to re-derive estimations for dependent nodes. Thus, the nodes labeled one (1) in FIG. 4 are executed first. Then re-derivation is performed based on what actual data was obtained via the first execution.

Because of using executing lower nodes first, processing may be limited by user-specified time (or by level). Thus, for example, if a time budget is set and expires, measurements and derived computations up to that point are valid, with estimates used for those nodes that were not executed. However, a level needs to be executed entirely, or not at all, because a mix of estimated data and actual data on the same level may lead to worse results (e.g., first estimate causes a plan to look better if compared with actual data that replaced a second estimate, but only had the second estimate not been replaced; the first estimate may not be better if there was also time to replace it with actual data.)

Other aspects are directed towards efficiency. For example, the query tuner may choose to use an estimate rather than run a query if a node is likely to have a good quality estimate, e.g., certain nodes may be associated with a percentage "likely-correct" estimate. If the quality of the estimate exceeds a threshold, the query may not be run.

An estimated time to run the query may also be a factor, e.g., based on known data, what will be likely a very long query to run may be bypassed in favor of using the estimated data. This may be based on a threshold, which may further vary based on how much of the time budget will likely be consumed, e.g., use the estimate if executing the node will use more than half of the total budget, or will likely consume the remaining time.

The quality and time factors may be combined. For example, the quality of the estimate may impact the allotted time threshold, and/or vice versa. In this way, running an estimated long execution when a (likely) high quality estimate is already available may be skipped, whereas a low quality estimate corresponding to a likely fast execution will be run. Whether a medium quality, medium time will be run or not depends on how the factors combine to modify the threshold.

Another consideration is in selecting the node to execute. In general, a filter node execution is performed over a table. For example, if the query corresponds to a join of customers and a particular (filtered) country, which country matters, as the United States will typically have more customers than Luxemburg. Thus, the actual query time as well as the estimate depends on which country. However, the query may name the country, whereas the table that contains the customer data may be arranged by country code. By executing the filter fragment to obtain the country code, the country code can be used to access histogram data or the like that gives a better quality estimate and/or a better estimate of how long it will take to run the actual query.

Other aspects that may speed execution may also be leveraged. For example, the results of a sub-query that is often executed for different queries may be cached for use among different queries. A sub-query may be run in anticipation of its usage. For example, consider a query that is submitted every Monday and will be used a lot during the week; however due to a slight change each week, re-optimization/re-tuning is necessary. A significant amount of the sub-query data can be accumulated over the weekend in anticipation that the modified query will be submitted.

As can be seen, the query tuner provides actual execution of query fragments during compilation time, and combines the results obtained with traditional, statistics-based estimation. This feedback is used to revise or clarify optimization assumptions and decisions at compilation time, resulting in improved costing information, and therefore a more reliable selection of plans by the query optimizer.

By way of summary, FIG. 5 describes some of the various aspects and example steps that may be used in one query tuner implementation. Note that many of the described steps are only examples and may be optional, e.g., top down querying may not always start at the top level in some implementations, the quality or time saving of an estimate may not be considered, and so forth. There may also be numerous additional steps not shown in FIG. 5. Still further, the order of many of the example steps may vary.

Step 502 represents starting the query tuner 106, such as by beginning with a tree built and selected by a standard query optimizer, and annotating the nodes with the statistical estimates for each node. Step 504 represents evaluating whether the query tuner invocation includes a specified limit (e.g., typically time in a bottom up traversal, although the number of levels in a bottom up traversal is another possible type of limit).

If a limit or other mechanism is used to specify bottom up traversal, then the process branches to step 530, described below. Otherwise a top down, full traversal is performed, beginning at step 506 in this example.

Step 506 represents whether a certain depth level was specified for starting the top down traversal. If so, step 508 advances the process to select an appropriate node from that level, otherwise the root is the starting level. Step 510 represents starting the top-down querying; note that the child node that is next selected (e.g., the left or right path below a join) may be based on statistics, filter-over-table considerations, and so on, as described above.

Step 512 represents evaluating whether it is legal to run a query on the selected node, as also described above. If not, the estimate is used. Step 514 represents determining whether the estimate is good enough, such as based on likely execution time, quality of the estimate, or a combination of both as described above. Note that if step 514 is present, the thresholds for "good" may be much stricter for top-down traversal, e.g., because the purpose of choosing a top-down traversal, rather than a limited bottom-up traversal, is a complete evaluation to the extent possible.

Step 516 represents running the query and updating the statistics based on the actual results. Steps 518 and 520 repeat the execution until all fragments have been processed. Step 522 then uses the updated statistics to rearrange the tree into the execution plan, like a standard query optimizer, but with at least some actual cardinalities rather than estimated cardinalities.

Step 530 and those below it represent the alternative, bottom-up budgeted query tuning (note that if time is limited, it is possible that all the sub-queries will be completed within the budgeted time). A level limit is another alternative.

Step 532 represents evaluating whether it is legal to run a query on the selected node, as also described above. If not, the estimate is used. Step 534 represents determining whether the estimate is good enough, such as based on likely execution time, quality of the estimate, or a combination both as described above. As mentioned above, the thresholds for "good" may be lower for bottom-up traversal, and/or also may vary based on percentage of budget, and so forth.

Step 536 represents running the query and updating the statistics based on the actual results. After each query, the limit is checked at step 540; note that this is primarily for a time limit (it is alternatively feasible to check for the time after each level is complete, and also check for any level-limited querying after a level is complete). If a time limit is reached, any query data obtained for a non-completed level is discarded at step 544, to avoid mixing estimates with actual data on the same level. The tree is then rearranged to obtain a final execution plan at step 544.

If the limit is not reached, step 546 evaluates whether all nodes have been processed. If so, step 554 is executed as described above.

If not done by limit or by exhausting nodes, step 548 evaluates whether a level has been completed. If not, the execution continues with the next fragment on that level via step 552. If so, the data obtained at that level is used to re-derive higher levels, as described above. The process then repeats on the higher level until the limit is reached or no more nodes remain.

Exemplary Operating Environment

Figure 6:
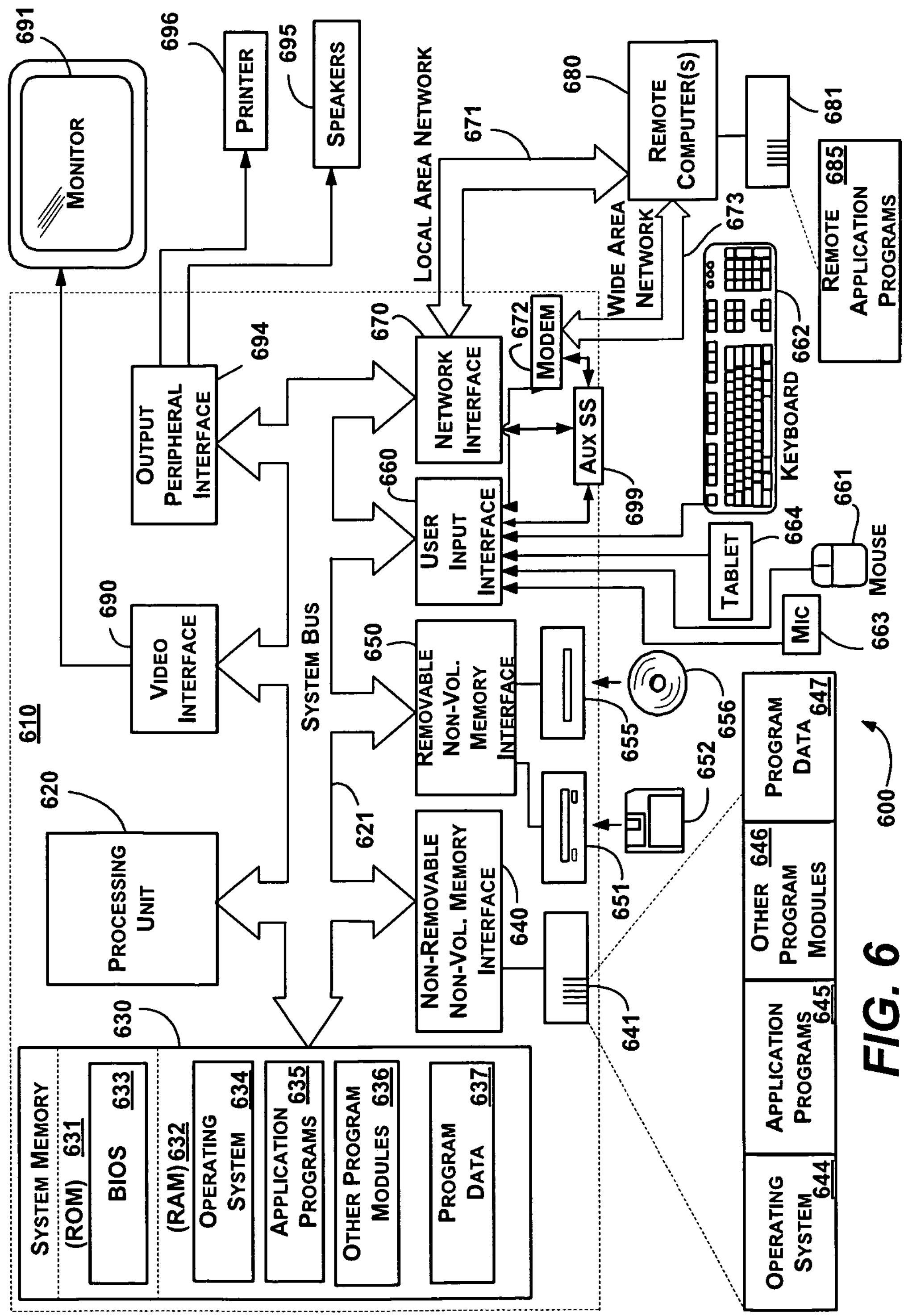
FIG. 6 shows an illustrative example of a computing environment into which various aspects of the present invention may be incorporated.

FIG. 6 illustrates an example of a suitable computing and networking environment 600 on which the examples and/or implementations of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, embedded systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 655 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 645 and program data 647. Note that these components can either be the same as or different from operating system 634, application programs 635, other program modules 635, and program data 637. Operating system 644, application programs 645, other program modules 645, and program data 647 are given different numbers herein to illustrate that, at a minimum, they are different copies. A user may enter commands and information into the computer 610 through input devices such as a tablet, or electronic digitizer, 654, a microphone 653, a keyboard 652 and pointing device 651, commonly referred to as mouse, trackball or touch pad. Other input devices not shown in FIG. 6 may include a joystick, game pad, satellite dish, scanner, or the like. These and other input devices are often connected to the processing unit 620 through a user input interface 650 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 695, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 650 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 650 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:

receiving a query and a query hint submitted to a compilation process, the query hint specifying a time limit for overhead of query optimization;

obtaining a tree of nodes corresponding to the query;

selecting a fragment of the query to execute during query compilation time;

during the query compilation time, executing the selected fragment of the query by executing a subset of nodes from the tree of nodes to determine actual execution data for the subset of nodes, wherein each node in the subset of nodes is selected for inclusion in the subset of nodes based on a combination of a quality of estimated data for the node and estimated execution time for the node; and using the actual execution data from the execution of the subset of nodes determined during query compilation time to determine an execution plan corresponding to the query.

2. The method of claim 1 wherein using the actual execution data comprises combining actual data obtained for executed nodes with estimated data for unexecuted nodes.

3. The method of claim 1 further comprising obtaining estimated data for nodes of the tree, and wherein using the actual execution data comprises changing at least some of the estimates based upon the actual execution data determined during query compilation time.

4. The method of claim 1 further comprising updating the execution plan based on the subset of nodes that were executed during the query compilation time.

5. The method of claim 1 wherein executing the subset of nodes comprises performing a top-down traversal starting from a node at a level below a root node.

6. The method of claim 1 wherein executing the subset of nodes comprises performing a bottom-up traversal starting from an execution node at a lowest level.

7. The method of claim 1 wherein executing the subset of nodes comprises performing a bottom-up traversal, including re-deriving data associated with higher-level nodes upon completion of processing nodes of a lower level.

8. The method of claim 1 further comprising:
using the actual execution data of the fragment of the query to update the statistics data into updated data; and
using the updated data and any non-updated data to determine the execution plan for the query.

9. The method of claim 1 wherein obtaining the tree of nodes comprises running a query optimizer that obtains the tree of nodes based on estimates.

10. The method of claim 1 wherein each node in the subset of nodes is selected for inclusion in the subset of nodes in response to a metric for the node exceeding a threshold, the metric being the combination of the quality of estimated data for the node and the estimated execution time for the node.

11. The method of claim 10 wherein the threshold is based on the time limit.

12. In a computing environment, a system comprising a computer comprising a query tuner that:
obtains a tree of nodes corresponding to a query and a query hint specifying a time limit for overhead of query optimization, including statistics data accompanying executable nodes by which estimated execution time may be computed; and
selects a fragment of the query to execute during query compilation time;
wherein the query tuner, during the query compilation time, executes the selected fragment of the query by executing a subset of nodes from the tree of nodes to determine actual execution data for the subset of nodes, wherein each node in the subset of nodes is selected for inclusion in the subset of nodes based on a combination of a quality of estimated data for the node and estimated execution time for the node, and using the actual execution data from the execution of the subset of nodes determined during query compilation time to determine an execution plan corresponding to the query.

13. The system of claim 12 further comprising a plan cache for maintaining the execution plan.

14. The system of claim 12 wherein the query tuner includes a mechanism for skipping execution of some of the executable nodes.

15. The system of claim 14 wherein the mechanism comprises means for starting a top-down tree traversal at a level below a root node.

16. The system of claim 14 wherein the mechanism comprises means for ending a bottom up tree traversal at a level below a root node.

17. The system of claim 14 wherein the mechanism comprises means for ending a bottom up tree traversal upon a time expiration.

18. The system of claim 14 wherein the mechanism includes means for determining an estimate is good enough.

19. One or more computer storage media comprising computer-executable instructions that, when executed, perform steps including:
receiving a query and a query hint submitted to a compilation process, the query hint specifying a time limit for overhead of query optimization;
obtaining a tree of nodes corresponding to the query;
selecting a fragment of the query to execute during query compilation time;
during the query compilation time, executing the selected fragment of the query by executing a subset of nodes from the tree of nodes to determine actual execution data for the subset of nodes, wherein each node in the subset of nodes is selected for inclusion in the subset of nodes based on a combination of a quality of estimated data for the node and estimated execution time for the node; and
using the actual execution data from the execution of the subset of nodes determined during query compilation time to determine an execution plan corresponding to the query.

20. The one or more computer storage media of claim 19 wherein traversing the tree of nodes comprises one of:
traversing the tree in a top-down traversal, and
traversing the tree in a bottom-up traversal.

* * * * *